United States Patent [19]

Stirling

[11] 4,208,883
[45] Jun. 24, 1980

[54] COMPRESSORS FOR HEAT PUMPS
[75] Inventor: Robert Stirling, Gayton, England
[73] Assignee: The Electricity Council, London, England
[21] Appl. No.: 910,993
[22] Filed: May 30, 1978
[30] Foreign Application Priority Data
  Jul. 18, 1977 [GB] United Kingdom ............... 30130/77
[51] Int. Cl.² ............................................. F25B 43/02
[52] U.S. Cl. ......................................... 62/192; 62/472
[58] Field of Search ............... 62/192, 472; 236/99 R, 236/DIG. 11; 73/368.2

[56] References Cited
U.S. PATENT DOCUMENTS

| | | | |
|---|---|---|---|
| 997,187 | 7/1911 | Fournier | 236/DIG. 11 |
| 2,116,802 | 5/1938 | Shivers | 236/99 R |
| 2,303,182 | 11/1942 | Tobey | 73/368.2 |
| 3,705,499 | 12/1972 | Mount et al. | 62/472 X |

Primary Examiner—William E. Wayner
Attorney, Agent, or Firm—Beveridge, De Grandi, Kline & Lunsford

[57] ABSTRACT

A compressor for a heat pump using a condensible gas as a working fluid has a lubricant temperature controller comprising a heater for the lubricant in the sump, the heater being controlled by differential pressure responsive means comprising the vapor pressure above the lubricant in the sump with a pressure obtained from a sensor bulb in the sump oil, the bulb containing a solution, in a lubricant of a refrigerant, the refrigerant preferably being the same as the working fluid of the heat pump.

2 Claims, 4 Drawing Figures

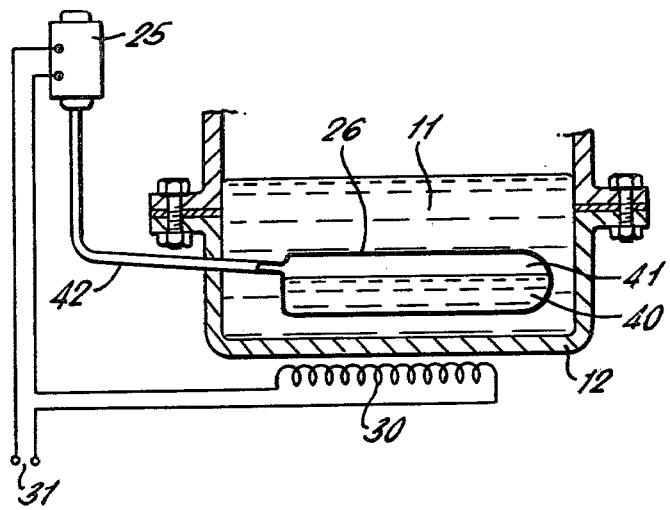
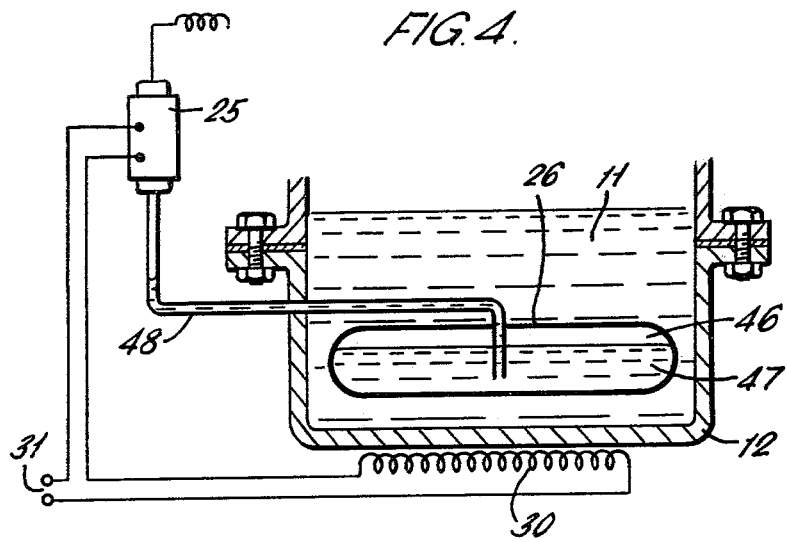

COMPRESSORS FOR HEAT PUMPS

BACKGROUND OF THE INVENTION

1. Field of the Invention

This invention relates to compressors for heat pumps and is concerned more particularly with the lubrication of a compressor having moving parts exposed to a condensible gas constituting the working fluid.

2. Prior Art

A heat pump employing a condensible gas has a compressor to compress the gas, the high pressure gas then being passed through a condenser/heat-exchanger to condense the working fluid and to transfer heat to a heat output system, the working fluid, which is now a liquid under pressure, then being expanded and passed through an evaporator/heat-exchanger to absorb heat from an input system before returning in vapour form to the compressor. Many working fluids are known for such heat pumps; halocarbon refrigerants are widely used for this purpose because of their particularly suitable physical characteristics. Although, for small heat pumps, sealed compressor units, e.g. using a diaphragm-type compressor, are sometimes employed, for a larger heat pump it is preferred to use open compressors, for example of the piston and cylinder type or rotary compressors of the axial or centrifugal fan type. In such open compressors, there are moving parts which are exposed to the working fluid and these moving parts have to be lubricated.

In general heat pump working fluids such as halocarbon refrigerants are highly soluble in lubricating oil and the resulting change in the oil composition due to the dissolving of refrigerant can lead to a large reduction in the viscosity of the oil. The solubility of the working fluid in the oil increases with pressure and hence the greater the pressure of the working fluid to which the oil is exposed, the lower is the resultant viscosity. Increase of temperature normally reduces the viscosity of an oil but, when the working fluid is dissolved in the oil, the effect is more complex. Increase of temperature decreases the solubility of the working fluid. As a result, in general for any given working pressure, there is some temperature at which the viscosity is a maximum. Below this particular temperature, the increased solubility of the working fluid in the oil is the predominant effect giving decreased viscosity whilst above this particular temperature the viscosity decreases because the effect of temperature on the viscosity of the oil is the predominant effect. The temperature at which the viscosity is a maximum depends on the pressure. Due to the solution of the working fluid in the oil, there are very substantial changes in viscosity of lubricating oil exposed to such working fluid in the ranges of temperatures and pressures commonly employed in heat pump compressors. This has lead to problems in the lubrication of working parts in such compressors.

SUMMARY OF THE INVENTION

According to this invention, in a compressor for a heat pump employing a condensible gas as a working fluid and having lubricated moving parts exposed to the working fluid, there are provided heating means arranged for heating the lubricant and control means including sensing means responsive to the lubricant temperature and the working fluid pressure to which the lubricant is exposed, which control means are arranged to control the heating means so as to maintain a predetermined relationship between the lubricant temperature and working fluid pressure.

In the simplest form, splash lubrication would be employed with the lubricant draining to a sump. If more complex lubricating systems are employed, in general the oil will drain into a sump which is exposed to the working fluid. Conveniently control is effected in accordance with the vapour pressure above the lubricant in the sump and the temperature of the lubricant in the sump. The heating means may comprise an electrical heating element in or adjacent the sump. This heating element may be controlled by a differential pressure switch responsive to the difference in pressure between the working fluid pressure above the lubricant in the sump and a pressure dependent on the temperature of the lubricant in the sump. This latter pressure may be derived from a sensor immersed in the lubricant in the sump.

A particularly convenient way of sensing the temperature of the lubricant in the sump is to employ a sensor bulb containing an oil and a refrigerant fluid, the sensor bulb being immersed in the lubricant in the sump so as to be responsive to the temperature thereof. The pressure developed in the sensor bulb will depend on the solubility of the refrigerant fluid in the oil and hence on the temperature; this pressure may be applied to one side of the aforementioned pressure differential switch, the pressure of the working fluid in the sump being applied to the other side of the differential pressure switch. This use of a sensor bulb enables a pressure to be applied to the differential pressure switch which is a function of the temperature of the lubricant in the sump. The relationship between the pressure and the temperature can be predetermined by the choice of the refrigerant and oil in the bulb and their proportions. A particularly advantageous arrangement is to employ, in the bulb, the same working fluid as is used in the compressor and the same oil as is used as a lubricant in the compressor, the proportion of refrigerant dissolved in the oil in the bulb being that corresponding to maximum viscosity of the solution. If the mass of refrigerant gas in the bulb and associated pipework is, at all times, very much less than the mass of liquid refrigerant dissolved in the oil, then the mixture will remain substantially fixed in composition for all working temperatures. The sensor bulb constitutes a device providing a vapour pressure appropriate to the temperature of the liquid refrigerant/oil charge in it and this charge does not sensibly change its composition during operation. If the refrigerant and the oil in the bulb are the same materials as the working fluid and lubricant in the compressor and if the composition in the bulb is chosen as the optimum mixture for maximum viscosity, then, as will now be explained, the compressor sump oil will be maintained at the maximum possible viscosity. Consider firstly the lubricant in the sump and hence the sensor bulb to be at a temperature lower than optimum.

This indicates a greater than optimum amount of refrigerant (working fluid) dissolved in the lubricant in the sump. Consequently the sump pressure is higher than that of the sensor bulb because mixtures with higher refrigerant concentrations have higher vapour pressures. In this mode the differential pressure switch applies power to the heater and the sump rises towards the optimum temperature. Conversely if the sump lubricant temperature is higher than optimum then the concentration of dissolved refrigerant (working fluid) is lower than optimum and hence is lower than in the sensor bulb. The sump pressure is, therefore, lower than the sensor pressure and the differential pressure switch in this mode switches off power from the heater. The sump will now cool to the optimum temperature. A stable condition is reached when the sump temperature is optimum and the working fluid concentration in the sump lubricant equals the refrigerant concentration in the oil in the sensor bulb. This is the condition of maximum viscosity.

It will be noted that the magnitude of the maximum viscosity for any given pressure decreases with rise of pressure. If the pressure should rise, the system serves to effect heating of the lubricant so as to tend to maintain the temperature at the appropriate value for the new pressure. If the pressure should fail, then the viscosity will inherently increase. The heating will be kept switched off and the system is perfectly safe in that the viscosity will further increase as the temperature tends to fall until the temperature reaches that corresponding to maximum viscosity at the new pressure. The control system automatically will tend to maintain this new temperature. It will be seen therefore that a simple arrangement using a heater and differential pressure switch and employing the same materials in the bulb as are used for the lubricant and working fluid in the compressor inherently tends to keep the viscosity at the maximum possible for the ambient working fluid pressure in the sump.

It will be readily appreciated however that other relationships between pressure and temperature may readily be obtained; for example by appropriate choice of the materials in the bulb.

BRIEF DESCRIPTION OF THE DRAWINGS

FIG. 3 is a diagram showing in further detail a sump of a compressor with a sump oil heater and sensor bulb used in the heat pump of FIG. 1; and FIG. 4 is a diagram similar to FIG. 3 illustrating another embodiment of sump and sensor.

DESCRIPTION OF THE PREFERRED EMBODIMENTS

Figure 1:
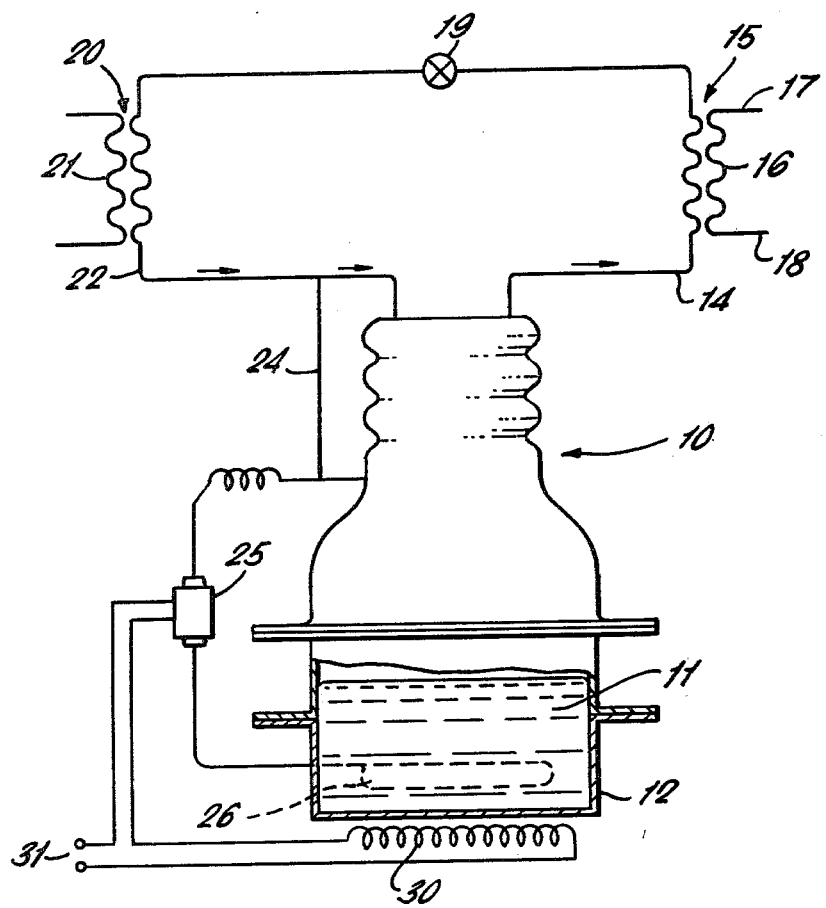
FIG. 1 is a diagram illustrating a heat pump having a compressor with a sump oil temperature controller and constituting one embodiment of the invention.

Referring to FIG. 1 there is shown diagrammatically a heat pump having a compressor 10 which, in this embodiment, is of the piston type, the piston or pistons being splash lubricated by lubricant 11 in a sump 12. The heat pump makes use of a condensible vapour working fluid, for example a halocarbon such as one of the refrigerants sold under the trade name "Freon". The compressor discharges the compressed working fluid into a line 14 which feeds a condenser/heat-exchanger 15 where the working fluid is condensed and the heat is transferred to a heat utilisation means, typically to heat a circulating fluid passed through a heating coil 16 in the condenser and connected by pipes 17, 18 to the required point of utilisation. The condensed working fluid from the condenser/heat-exchanger 15 is passed through an expansion valve 19 and thence into an evaporator/heat-exchanger 20 where it absorbs heat from a heat input system 21, the low pressure working fluid being fed back at 22 to the compressor 10. The region above the lubricant 11 in the sump 12 of the compressor is maintained at the low pressure by a connection 24 and this low pressure is also applied to one side of a differential pressure switch 25. The other side of this differential pressure switch 25 is connected to a sensor bulb 26 in the sump. This sensor bulb will be further described later, particularly in connection with FIGS. 3 and 4. The differential pressure switch 25 has electrical contacts which control the energisation of an electrical heater 30 from power input terminals 31, the heater 30 being adjacent the bottom of the sump 12.

Figure 2:
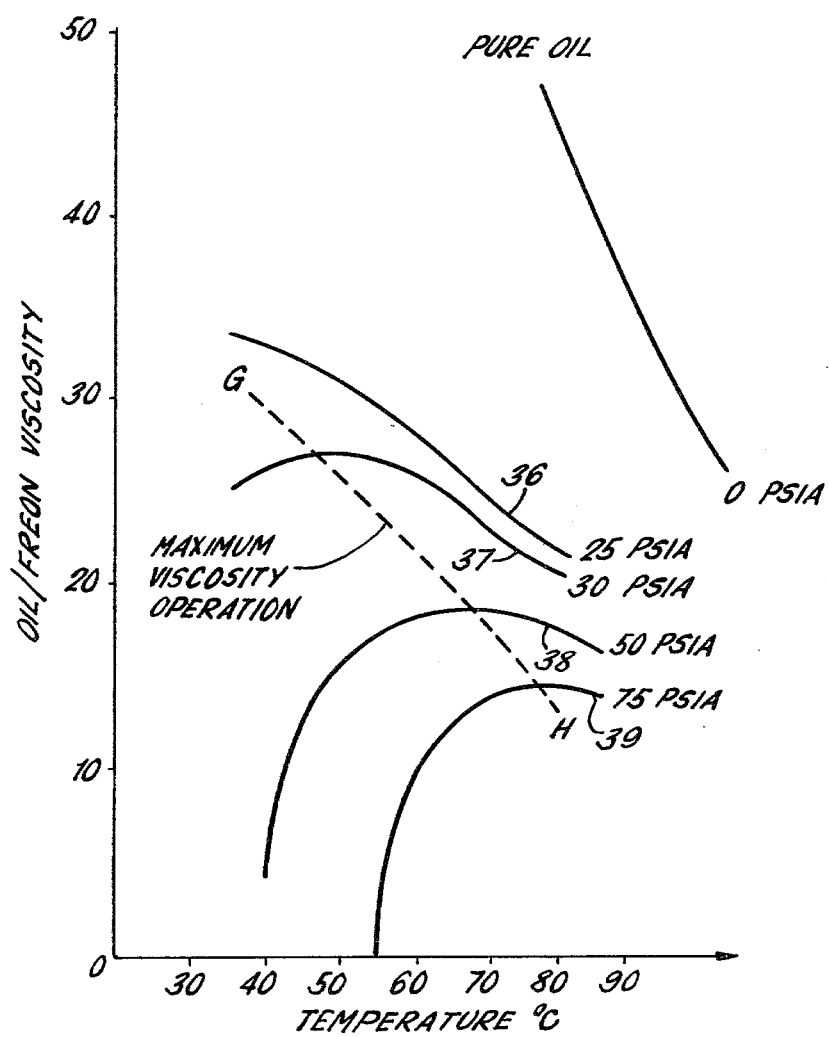
FIG. 2 is a graphical diagram illustrating the relationship between the viscosity of an oil halocarbon solution and temperature of the solution for varying pressures.

Turning to FIG. 2 this graphical diagram shows a curve 35 indicating the relationship between viscosity and temperature for a particular lubricating oil used in one embodiment of the invention. Curves 36, 37, 38, 39 indicate the relationships between viscosity and temperature for this oil when in contact with a particular halocarbon refrigerant at a pressure of 25, 30, 50 and 75 lbs/sq.in. absolute respectively. As is clearly seen from the curves 37, 38, 39, there is a maximum viscosity at a temperature which increases with increasing pressure. The dashed line G-H shows the desirable operating characteristic for the pressure/temperature relationship of the lubricant to be employed in the compressor. The viscosity is directly related to the composition of the lubricant-working fluid solution and the positions of maximum viscosity in the various curves correspond to an optimum and almost constant quantity of working fluid in solution.

To control the temperature of the lubricant in the sump, the aforementioned sensor bulb 26 contains a liquid charge which, in this particular embodiment, has the same refrigerant working fluid and the same oil as are used in the compressor. The amount of the refrigerant dissolved in the oil is made such that it gives, at any given temperature, the maximum viscosity as explained above. Since the composition depends on both temperature and pressure and since the components of the solution are the same for both the sensor bulb and the sump oil, if the pressures on the two sides of the differential switch are equal, then the pressure in the sensor bulb is the same as that in the sump and the composition of the solution in the sump is the same as that in the sensor bulb and hence is the composition for maximum viscosity. The pressure switch 25 is arranged so that the heater 30 is switched on when the pressure in the sensor bulb 26 is less than that in the region above the lubricant in the sump and is switched off when the pressure in the bulb exceeds that in the region above the lubricant in the sump. Thus the temperature of the oil in the sump is automatically controlled to maintain these two pressures equal when the pressure is increasing. When the pressure is decreasing, the heater remains switched off and the gradual cooling of the sump tends to maintain these two pressures equal. The maintenance of maximum viscosity is, generally speaking, the optimum condition for lubrication. However, other working characteristics can be obtained, if so desired, using a sensor bulb as described above, by appropriate choice of the materials and their proportion in the bulb.

FIG. 3 illustrates in more detail one arrangement of bulb connected to a differential pressure switch. In the arrangement of FIG. 3, the bulb 26 is shown as containing the oil with dissolved refrigerant at 40 above which is a region 41 containing the refrigerant vapour, this region 41 being connected by a vapour-filled pipe 42 to one side of the aforementioned differential pressure switch.

In FIG. 4 there is shown another arrangement in which the bulb 26 contains oil with dissolved refrigerant at 45 with a vapour region 46 above the liquid 47, this vapour region containing the refrigerant vapour. The connection to the pressure switch in this case however is by a liquid-filled pipeline 48 which extends into the bulb at a point below the surface of the liquid.

With the arrangement of FIG. 3, the total vapour region above the liquid in the bulb and in the connecting pipe 42 and differential pressure switch must be sufficiently small, under all operating conditions, that the evaporation of the refrigerant material would not appreciably alter the composition of the solution. In this arrangement, the pipe 42 must have an upward run and be of sufficient diameter to allow any condensed refrigerant to return by gravity to the bulb. It is desirable that the liquid level in the bulb should be below the point D in FIG. 3 where the pipe 42 passes through the sump wall because, with an external heater as shown in this arrangement, the sump wall may be hotter than the oil and hence any liquid charge in the bulb, if it extended as far as the point D would be at a higher temperature and might cause premature switch-off of the heating element. The advantage however of the arrangement of FIG. 3 is that the connection 42 is not critical with respect to the temperature of the sump wall at the point D since this connection, as explained above, contains vapour and not liquid.

In the arrangement of FIG. 4, a liquid connection is provided between the bulb and the differential pressure switch and it is important to ensure that the temperature of the sump wall at the point D does not exceed the sump oil temperature; otherwise the resulting high pressure can cause premature switch-off of the heating element. The advantage however of the construction of FIG. 4 is that the length of the connecting pipeline 48 and its diameter are not critical and hence there is much more freedom in the siting of the pressure switch 25. In the arrangements of both FIGS. 3 and 4 it is desirable that the heat transfer from the sensor bulb to the compressor body is minimised to ensure that the sensor bulb and lubricant in the sump are at the same temperature.

I claim:

1. In a compressor for a heat pump employing a condensible gas as a working fluid and having lubricated moving parts exposed to the working fluid, with a sump into which the lubricant drains, the lubricant in the sump being exposed to the working fluid, the improvement comprising an electrical heating element in or adjacent the sump and arranged for heating the lubricant, a sensor including a sensor bulb containing a quantity of said lubricant and of said working fluid, the proportion of working fluid dissolved in the lubricant in the bulb being that corresponding to maximum viscosity of the solution, the sensor bulb being immersed in the lubricant in the sump so as to provide an output pressure dependent on the temperature of the lubricant in the sump, and control means including a differential pressure switch responsive to the difference in pressure between the working fluid pressure above the lubricant in the sump and the output pressure from the sensor dependent on the temperature of the lubricant in the sump, the control means being arranged to control the heating means so as to maintain a predetermined relationship between the lubricant temperature and working fluid pressure.

2. A compressor as claimed in claim 1 and having the sensor bulb with its associated pipework so filled that, at all times, the mass of working fluid in vapour form in the bulb and associated pipework is very much less than the mass of working fluid dissolved in the lubricant in the bulb, so that the mixture will remain substantially fixed in composition for all working temperatures.

* * * * *